United States Patent
Yamada et al.

(10) Patent No.: US 7,973,500 B2
(45) Date of Patent: Jul. 5, 2011

(54) CONTROL APPARATUS FOR MOTOR

(75) Inventors: Kenji Yamada, Toyota (JP); Hideaki Saida, Toyota (JP); Takuo Watanabe, Toyota (JP)

(73) Assignee: Toyota Jidosha Kabushiki Kaishi, Toyota-shi (JP)

( * ) Notice: Subject to any disclaimer, the term of this patent is extended or adjusted under 35 U.S.C. 154(b) by 547 days.

(21) Appl. No.: 12/087,419

(22) PCT Filed: Dec. 5, 2006

(86) PCT No.: PCT/JP2006/324632
§ 371 (c)(1),
(2), (4) Date: Jul. 3, 2008

(87) PCT Pub. No.: WO2007/080728
PCT Pub. Date: Jul. 19, 2007

(65) Prior Publication Data
US 2008/0315813 A1    Dec. 25, 2008

(30) Foreign Application Priority Data
Jan. 10, 2006    (JP) .................. 2006-002572

(51) Int. Cl.
H02P 3/14    (2006.01)
(52) U.S. Cl. .............. 318/376; 318/400.38; 318/400.39; 318/400.4; 701/93; 701/90; 701/84; 701/87
(58) Field of Classification Search .................. 318/376, 318/400.38, 400.39, 400.4; 701/93, 90, 84, 701/87
See application file for complete search history.

(56) References Cited

U.S. PATENT DOCUMENTS

| 5,629,441 | A | * | 5/1997 | Kraus et al. | 558/357 |
| 6,448,728 | B2 | * | 9/2002 | Noro et al. | 318/433 |
| 6,879,888 | B2 | * | 4/2005 | Ochiai et al. | 701/22 |
| 2006/0165393 | A1 | | 7/2006 | Yamada | |

FOREIGN PATENT DOCUMENTS

| JP | A 59-6782 | 1/1984 |
| JP | A 1-298975 | 12/1989 |

(Continued)

OTHER PUBLICATIONS

Office Action issued in Japanese Patent Application No. 2006-002572 mailed Jul. 20, 2010 (with translation).

(Continued)

Primary Examiner — Walter Benson
Assistant Examiner — Erick Glass
(74) Attorney, Agent, or Firm — Oliff & Berridge, PLC

(57) ABSTRACT

A normal revolution number calculation unit calculates a normal revolution number of a driving motor generator in every control period, based on a signal from a rotational position sensor. A moving average calculation unit calculates a moving average revolution number of the normal revolution number given in every control period. A predicted revolution number calculation unit determines whether or not the revolution number of the motor generator is in an increasing state, from the locus of the moving average revolution number. Determining that the revolution number of the motor generator is in the increasing state, the predicted revolution number calculation unit calculates a predicted revolution number based on respective moving average revolution numbers in the present and preceding control periods. The calculated predicted revolution number is set to be used as a control revolution number and output to a motor control unit and a torque command calculation unit.

8 Claims, 8 Drawing Sheets

FOREIGN PATENT DOCUMENTS

| | | |
|---|---|---|
| JP | A-6-296396 | 10/1994 |
| JP | A 7-143606 | 6/1995 |
| JP | A 10-285868 | 10/1998 |
| JP | A 2001-145381 | 5/2001 |
| JP | A 2003-274508 | 9/2003 |
| JP | A 2005-210779 | 8/2005 |
| WO | WO 2005/069478 A1 | 7/2005 |

OTHER PUBLICATIONS

Mar. 12, 2010 Office Action issued in China Patent Application No. 200680050732.5 (with translation).

\* cited by examiner

CONTROL APPARATUS FOR MOTOR

TECHNICAL FIELD

The present invention relates to a control apparatus for a motor, and more particularly to a control apparatus for a motor that drives and controls the motor based on the number of revolutions of the motor.

BACKGROUND ART

Recently, hybrid vehicles and electric vehicles have been of great interest as environment-friendly vehicles. The hybrid vehicle is a motor vehicle including, as its motive power sources, a conventional engine and additionally a motor driven by a DC power supply through an inverter. Specifically, a motive power is obtained by driving the engine, and a motive power is also obtained by converting a DC voltage from the DC power supply into an AC voltage by the inverter and rotating the motor with the AC voltage generated by the conversion.

The electric vehicle is a motor vehicle including as its motive power source a motor driven by a DC power supply through an inverter.

For the hybrid vehicle or electric vehicle, a control apparatus driving and controlling the motor is proposed for example in Japanese Patent Laying-Open No. 2001-145381. The control apparatus determines the number of revolutions of the motor from the rotor position detected by a resolver, adjusts the phase of a rectangular-wave signal which is output to each of u, v and w phases of the motor based on the determined number of revolutions, and thereby controls the output torque of the motor.

Thus, in a motor control routine repeatedly performed at predetermined time intervals, the controller first reads the electrical angle of the rotor detected by the resolver, and uses the read electrical angle to calculate the number of revolutions of the motor. Subsequently, the controller determines the phase of the rectangular wave signal based on the calculated number of revolutions of the motor. According to the determined phase, a switching element for the u, v and w phases each is switched to control the torque of the motor.

Regarding the above-described control apparatus for the motor, however, in the case where a drive wheel skids for example to cause the number of revolutions of the motor to sharply increase, a large difference could be generated between the number of revolutions of the motor calculated from the read electrical angle and the number of revolutions of the motor while the output torque of the motor is being controlled. This difference is increased due to for example a delay in calculation of the controller and a delay in communication between the controller and the resolver.

In other words, due to the sharp increase of the number of revolutions of the motor, the number of revolutions of the motor while the motor is actually driven and controlled according to the set output torque could be significantly larger than the number of revolutions used for setting the output torque of the motor.

In this case, if the motor is driven in a power running mode, the motor-consumed power (torque×number of revolutions) which is expected when the motor output torque is set is exceeded by the motor-consumed power while the output torque is actually controlled. As a result, an excessively large electric power could be drawn from the DC power supply.

If the motor is driven in a regenerative mode, the motor-generated power which is expected when the motor output torque is set is exceeded by a motor-generated power while the output torque is actually controlled. As a result, an excessively large electric power could be given to the DC power supply.

As seen from the above, regarding the output torque control by means of the calculated number of revolutions of the motor, it is difficult to perform control adapted to a sharp change of the number of revolutions. Therefore, a problem arises that the DC power supply is overcharged or overdischarged to an extent exceeding the input/output power limit.

The present invention has therefore been made to solve the above-described problems. An object of the invention is to provide a control apparatus for a motor that can perform drive and control following a change of the motor operating state and that can prevent the power supply from being charged or discharged with an excessive power.

DISCLOSURE OF THE INVENTION

According to the present invention, a control apparatus for a motor drives and controls the motor according to a driving-force command value. The control apparatus for the motor includes: a revolution number detection unit detecting a number of revolutions of the motor; a moving average calculation unit calculating a moving average of a detected value of the number of revolutions; a revolution number estimation unit estimating a predicted number of revolutions at a predetermined control timing, using the calculated moving average; a driving-force command setting unit using the estimated predicted number of revolutions as a control revolution number and setting the driving-force command value at the predetermined control timing based on the control revolution number; and a motor drive control unit receiving an electric power from a power supply and driving and controlling the motor such that an output of the motor follows the driving-force command value.

Regarding the above-described control apparatus for the motor, the predicted revolution number is estimated using the moving average of the revolution number, so that the estimation can be made stably without influenced by small variations of the revolution number. The predicted revolution number is used as a control revolution number to drive and control the motor. Thus, the input/output power limitation of the power supply can be more strictly satisfied as compared with the conventional motor drive and control using, as the control revolution number, a predicted revolution number which is directly estimated from a detected revolution number. As a result, the power supply can be protected surely against overcharge and overdischarge.

Preferably, the driving-force command setting unit sets the driving-force command value such that, when the motor operates in a power running mode, an amount of power consumed by the motor according to the control revolution number and the driving-force command value does not exceed an output power limitation value of the power supply, and sets the driving-force command value such that, when the motor operates in a regenerative mode, an amount of power generated by the motor according to the control revolution number and the driving-force command value does not exceed an input power limitation value of the power supply.

Regarding the above-described control apparatus for the motor, the predicted revolution number which is estimated from the moving average is used as the control revolution number to determine the motor power balance. Therefore, as compared with the conventional motor drive and control using, as the control revolution number, a predicted revolution number which is estimated directly from a detected revolution number, the input/output power limitation of the power supply can be more strictly satisfied.

Preferably, the control apparatus for the motor further includes a revolution-number varying state determination unit determining whether the number of revolutions is in an increasing state or a decreasing state, based on the moving average. The revolution number estimation unit estimates the predicted number of revolutions at the predetermined control timing when it is determined that the number of revolutions is in the increasing state, and inhibits estimation of the predicted number of revolutions when it is determined that the number of revolutions is in the decreasing state.

Regarding the above-described control apparatus for the motor, the method of estimating the predicted revolution number is changed depending on whether the revolution number is in the increasing state or decreasing state. Therefore, the predicted revolution number can be estimated appropriately for assuming the motor power balance in each state.

Preferably, the revolution number estimation unit directly sets and outputs the detected value of the number of revolutions to be used as the predicted number of revolutions, when it is determined that the number of revolutions is in the decreasing state.

Regarding the above-described control apparatus for the motor, the detected value of the revolution number is used as the control revolution number when the revolution number is in the decreasing state. Therefore, it is prevented that the predicted revolution number is smaller than an actual revolution number to cause the actual power balance of the motor to exceed a power balance assumed from the predicted revolution number. As a result, the input/output power limitation of the power supply can be more strictly satisfied and overcharge and overdischarge of the power supply can be surely prevented.

Preferably, the revolution-number varying state determination unit determines that the number of revolutions is in the increasing state when the moving average increases in n (n is a natural number not less than 2) successive control periods, and determines that the number of revolutions is in the decreasing state when the moving average decreases in m (m is a natural number not less than 2) successive control periods.

Regarding the control apparatus for the motor as described above, erroneous determination of the increasing state/decreasing state of the revolution number is avoided.

Preferably, the revolution number estimation unit sets the predicted number of revolutions larger than the predicted number of revolutions that is estimated based on the moving average and lower than the detected value of the number of revolutions, in a period from start of decrease of the moving average to determination that the number of revolutions is in the decreasing state.

Regarding the control apparatus for the motor as described above, a sudden change is prevented of the control revolution number due to switching of the method of estimating the predicted revolution number immediately after the change of the revolution number from the increasing state to the decreasing state. Therefore, the stability of the motor drive and control can be maintained.

Preferably, the revolution-number varying state determination unit sets the n relatively smaller as an amount of increase of the moving average in the control periods is larger, and sets the m relatively smaller as an amount of decrease of the moving average in the control periods is larger.

Regarding the control apparatus for the motor as described above, when the revolution number sharply changes, the motor is immediately driven and controlled using the predicted revolution number as the control revolution number.

Therefore, the input/output power limitation of the power supply is satisfied more strictly to surely protect the power supply from overcharge and overdischarge.

According to the present invention, the drive and control following a change of the motor operating state can be performed so that the power supply can be prevented from being charged and discharged with an excessive power.

BEST MODES FOR CARRYING OUT THE INVENTION

Figure 1:
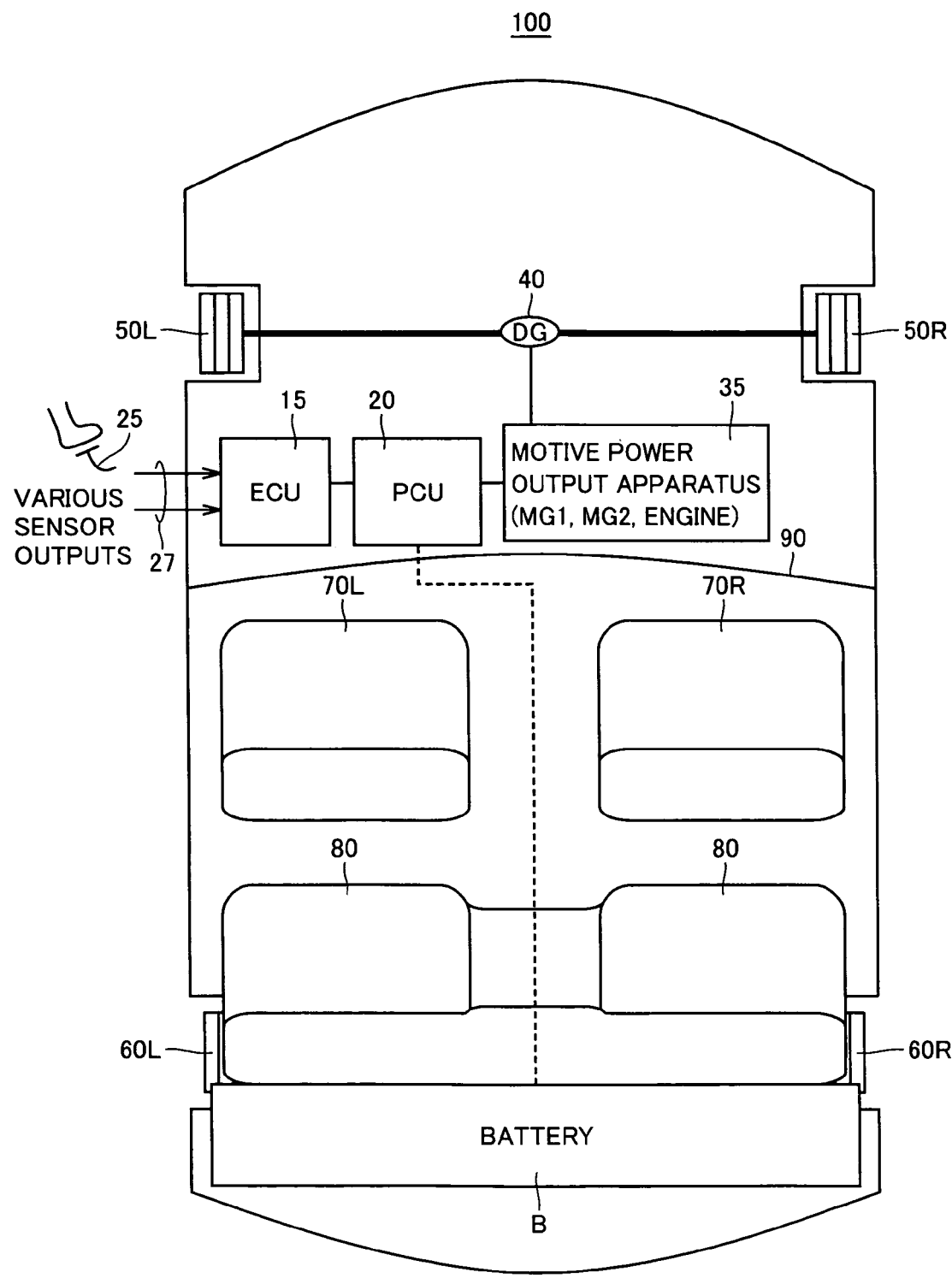
FIG. 1 is a block diagram illustrating a configuration of a motor vehicle equipped with a control apparatus for a motor according to an embodiment of the present invention.

In the following, an embodiment of the present invention will be described in detail with reference to the drawings. In the drawings, like reference characters denote like or corresponding components.

FIG. 1 is a block diagram illustrating a configuration of a motor vehicle equipped with a control apparatus for a motor according to an embodiment of the present invention.

Referring to FIG. 1, a hybrid vehicle 100 according to the present invention includes a battery B, an ECU (Electronic Control Unit) 15, a PCU (Power Control Unit) 20, a motive power output apparatus 35, a differential gear (DG) 40, front wheels 50L, 50R, rear wheels 60L, 60R, front sheets 70L, 70R and a rear sheet 80.

Battery B is formed for example of nickel-hydride or lithium-ion secondary cells. Alternatively, battery B may be a fuel cell or capacitor. Battery B supplies a DC voltage to PCU 20 and is charged with a DC voltage from PCU 20. Battery B is placed for example behind rear sheet 80 and electrically connected to PCU 20. PCU 20 generally represents an electric power converter that is necessary in hybrid vehicle 100.

To ECU 15, various sensor outputs 27 are supplied from various sensors that indicate running conditions and vehicle conditions. Various sensor outputs 27 include for example an accelerator pedal position from an accelerator pedal position sensor detecting how far an accelerator pedal 25 is depressed, a shift position from a shift position sensor, a brake pedal position from a brake pedal position sensor, and a vehicle speed from a vehicle speed sensor. ECU 15 comprehensively performs various control operations for hybrid vehicle 100 based on these sensor outputs as supplied.

Motive power output apparatus 35 includes an engine and motor generators MG1, MG2 provided as sources of a motive power for driving the wheels. DG 40 transmits the motive power from motive power output apparatus 35 to front wheels 50L, 50R and transmits a rotational force of front wheels 50L, 50R to motive power output apparatus 35.

Accordingly, motive power output apparatus 35 transmits the motive power generated by the engine and/or motor generators MG1, MG2 via DG 40 to front wheels 50L, 50R and thereby drives front wheels 50L, 50R. Further, motive power output apparatus 35 generates an electric power from a rotational force of front wheels 50L, 50R and supplies the generated electric power to PCU 20.

When motor generators MG1, MG2 operate in a power running mode, PCU 20 follows a control instruction from ECU 15 to increase the DC voltage from battery B and convert the increased DC voltage into an AC voltage and thereby drive and control motor generators MG1, MG2 included in motive power output apparatus 35.

Further, when motor generators MG1, MG2 operate in a regenerative mode, PCU 20 follows a control instruction from ECU 15 to convert an AC voltage generated by motor generators MG1, MG2 into a DC voltage and thereby charge battery B.

Thus, in hybrid vehicle 100, battery B, PCU 20 and a portion of ECU 15 that controls PCU 20 constitute a "control apparatus for a motor" driving and controlling motor generators MG1, MG2.

Next, a description will be given of a configuration of the control apparatus for a motor according to the present invention.

Figure 2:
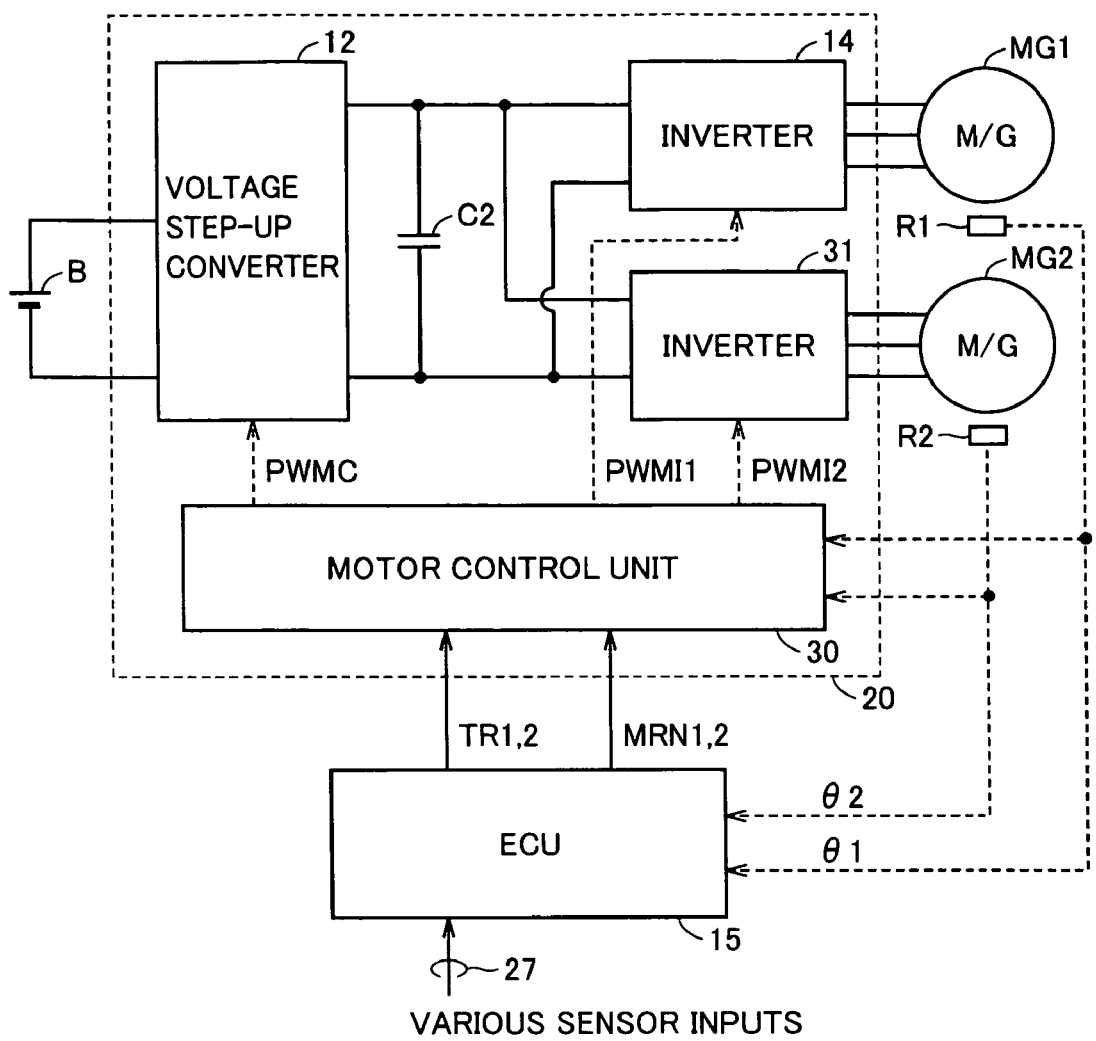
FIG. 2 is a functional block diagram of the control apparatus for a motor according to the present invention.

FIG. 2 is a functional block diagram of the control apparatus for a motor according to the present invention.

Referring to FIG. 2, the control apparatus for a motor includes battery B, a portion of PCU 20 that is involved in driving and controlling motor generators MG1, MG2 (this portion is also referred to simply as "PCU 20" hereinafter) and a portion of ECU 15 that is involved in controlling PCU 20 (this portion is also referred to simply as "ECU 15" hereinafter).

PCU 20 includes a voltage step-up converter 12, a smoothing capacitor C2, inverters 14, 31 associated respectively with motor generators MG1, MG2, and a motor control unit 30.

To ECU 15, in addition to above-described various sensor outputs 27, signals $\theta1$, $\theta2$ are input from rotational position sensors R1, R2 that are placed at motor generators MG1, MG2 respectively and detect the rotational position of an associated rotor.

ECU 15 calculates the motor revolution number of motor generators MG1, MG2 by means of a revolution number calculation routine (not shown) based on signals $\theta1$, $\theta2$ from rotational position sensors R1, R2. Based on the calculated motor revolution number, ECU 15 generates control revolution numbers MRN1, MRN2 that are used for driving and controlling motor generators MG1, MG2 by a method descried hereinlater.

Further, ECU 15 determines an output torque requested of motor generators MG1, MG2 (hereinafter also referred to as requested torque) in consideration of the output ratio or the like with respect to the engine, based on various sensor outputs 27. Moreover, ECU 15 performs electric-power balance control as described hereinlater based on above-described control revolution numbers MRN1, MRN2 and the requested torque of motor generators MG1, MG2 to generate torque command values TR1, TR2 for driving motor generators MG1, MG2.

Control revolution numbers MRN1, MRN2 and torque command values TR1, TR2 as generated are supplied to motor control unit 30.

Motor control unit 30 generates, based on torque command values TR1, TR2 and control revolution numbers MRN1, MRN2 from ECU 15, signal PWMC for controlling operation of voltage step-up converter 12 by a method described hereinlater. Further, based on torque command value TR1 and signal $\theta1$ from rotational position sensor R1, motor control unit 30 generates signal PWMI1 for controlling operation of inverter 14 by a method described hereinlater. Furthermore, based on torque command value TR2 and signal $\theta2$ from rotational position sensor R2, motor control unit 30 generates signal PWMI2 for controlling operation of inverter 31 by a method described hereinlater.

Figure 3:
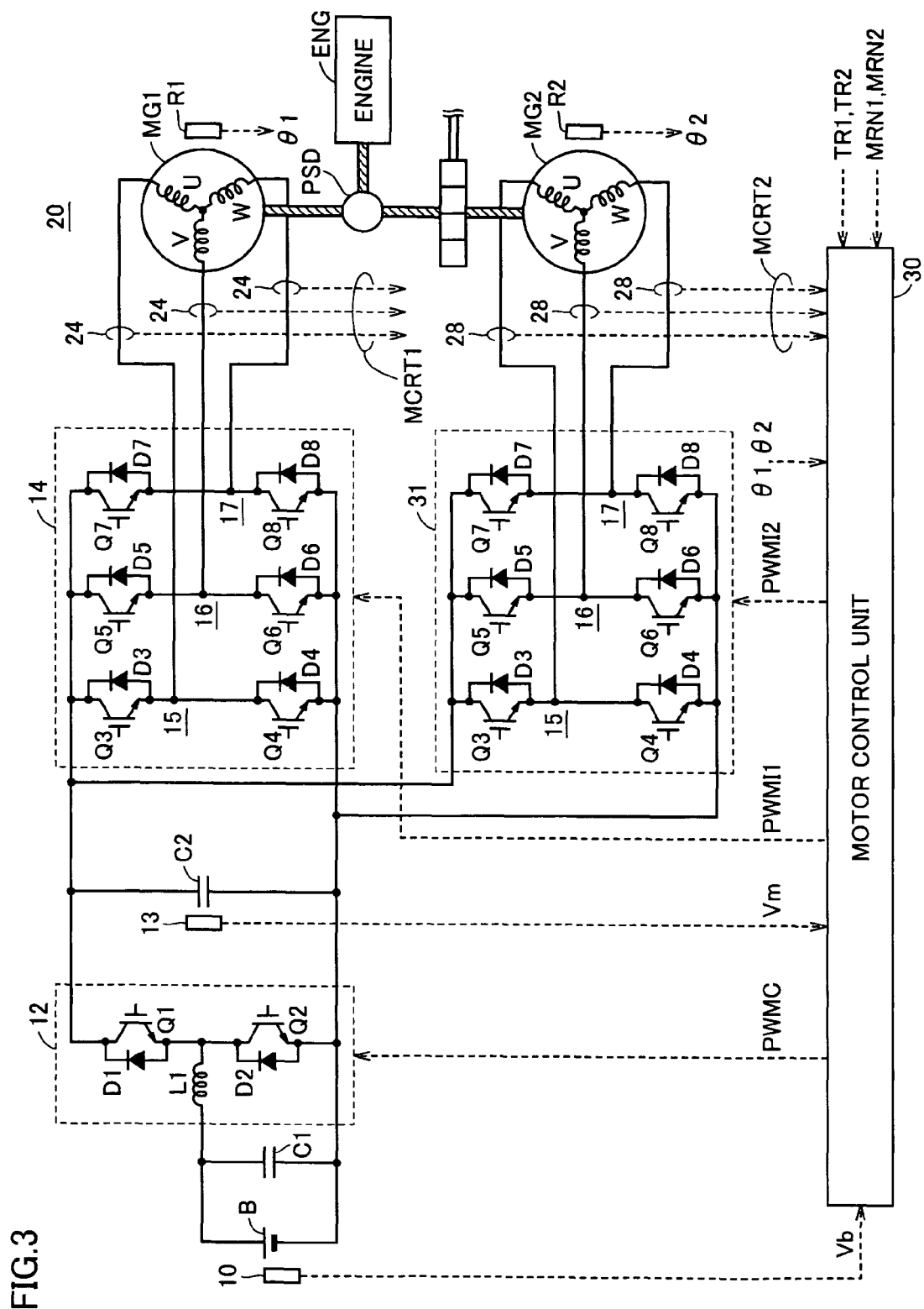
FIG. 3 is a circuit diagram showing a specific configuration of a PCU in FIG. 2.

FIG. 3 is a circuit diagram showing a specific configuration of PCU 20 in FIG. 2.

Referring to FIG. 3, PCU 20 includes voltage step-up converter 12, capacitors C1, C2, inverters 14, 31, voltage sensors 10, 13, current sensors 24, 28, and rotational position sensors R1, R2.

Engine ENG generates a driving force from a combustion energy of a fuel such as gasoline. The driving force generated by engine ENG is transmitted through a path divided into two paths by a power split device PSD as indicated by the bold and obliquely-hatched line in FIG. 3. One is a path for transmitting through a reduction gear (not shown) the force to a drive shaft that drives wheels. The other is a path for transmitting the force to motor generator MG1

Motor generators MG1, MG1 can function as both an electric power generator and an electric motor. However, as described below, motor generator MG1 operates chiefly as a generator and motor generator MG2 operates chiefly as a motor.

Specifically, motor generator MG1 is a three-phase AC rotating machine, and used, when acceleration is made, as a starter for starting engine ENG. At this time, motor generator MG1 is supplied with electric power from battery B and thus driven to serve as an electric motor and crank and start engine ENG.

Further, after engine ENG is started, motor generator MG1 is rotated by a driving force of engine ENG that is transmitted via power split device PSD to generate an electric power.

The electric power generated by motor generator MG1 is used differently depending on the operating state of the vehicle and the amount of charge of battery B. For example, under normal travel or under hard acceleration, the electric power generated by motor generator MG1 is directly used as an electric power for driving motor generator MG2. In contrast, when the amount of charge of battery B is smaller than a predetermined value, the electric power generated by motor generator MG1 is converted by inverter 14 from the AC power into a DC power and the DC power is stored in battery B.

Motor generator MG2 is a three-phase AC rotating machine and is driven with at least one of the electric power stored in battery B and the electric power generated by motor generator MG1. The driving force of motor generator MG2 is transmitted via the reduction gear to the drive shaft of wheels. In this way, motor generator MG2 assists engine ENG to cause the vehicle to travel or cause the vehicle to travel with only the driving force of MG2 itself.

When the vehicle is regeneratively braked, motor generator MG2 is rotated by wheels via the reduction gear to operate as an electric power generator. At this time, the regenerative power produced by motor generator MG2 is supplied via inverter 31 to charge battery B.

Voltage step-up converter 12 includes a reactor L1, IGBT (Insulated Gate Bipolar Transistor) devices Q1, Q2 and diodes D1, D2. Reactor L1 has one end connected to a power supply line of battery B and the other end connected to an intermediate point between IGBT device Q1 and IGBT device Q2, namely connected between the emitter of IGBT device Q1 and the collector of IGBT device Q2. IGBT devices Q1, Q2 are connected in series between a power supply line and a ground line. The collector of IGBT device Q1 is connected to the power supply line and the emitter of IGBT device Q2 is connected to the ground line. Further, between respective collectors and respective emitters of IGBT devices Q1, Q2, diodes D1, D2 allowing the current to flow from the emitter side to the collector side are connected.

Inverter 14 is formed of a U phase arm 15, a V phase arm 16 and a W phase arm 17. U phase arm 15, V phase arm 16 and W phase arm 17 are connected in parallel between the power supply line and the ground line.

U phase arm 15 is formed of series-connected IGBT devices Q3, Q4, V phase arm 16 is formed of series-connected IGBT devices Q5, Q6 and W phase arm 17 is formed of series-connected IGBT devices Q7, Q8. Between respective collectors and respective emitters of IGBT devices Q3 to Q8, diodes D3 to D8 for allowing the current to flow from the emitter side to the collector side are connected respectively.

The intermediate point of each phase arm is connected to an end of a corresponding phase coil of motor generator MG1. Specifically, respective one ends of three coils of U, V, W phases are commonly connected to a neutral point to form motor generator MG1, and the other end of the U phase coil is connected to an intermediate point between NPN transistors Q3, Q4, the other end of the V phase coil is connected to an intermediate point between NPN transistors Q5, Q6 and the other end of the W phase coil is connected to an intermediate point between NPN transistors Q7, Q8.

Inverter 31 is configured similarly to inverter 14.

Voltage sensor 10 detects a DC voltage Vb which is output from battery B and outputs detected DC voltage Vb to motor control unit 30.

Capacitor C1 smoothes DC voltage Vb supplied from battery B and provides smoothed DC voltage Vb to voltage step-up converter 12.

Voltage step-up converter 12 increases DC voltage Vb supplied from capacitor C1 and provides the resultant voltage to capacitor C2. More specifically, upon receiving signal PWMC from motor control unit 30, voltage step-up converter 12 increases DC voltage Vb according to the period in which IGBT device Q2 is rendered ON, and supplies the resultant voltage to capacitor C2.

Further, upon receiving signal PWMC from motor control unit 30, voltage step-up converter 12 decreases the DC voltage supplied via capacitor C2 from inverter 14 and/or inverter 31 to charge battery B.

Capacitor C2 smoothes the DC voltage from voltage step-up converter 12 and supplies the smoothed DC voltage to inverters 14, 31. Voltage sensor 13 detects the end to end voltage of capacitor C2, namely output voltage Vm of voltage step-up converter 12 (corresponding to the input voltage to inverters 14, 31, which is applied as well hereinafter), and outputs detected output voltage Vm to motor control unit 30.

Upon receiving the DC voltage from battery B via capacitor C2, inverter 14 converts the DC voltage into an AC voltage based on signal PWM1 from motor control unit 30 to drive motor generator MG1. Accordingly, motor generator MG1 is driven to generate a torque according to torque command value TR1.

Further, when hybrid vehicle 100 is regeneratively braked, inverter 14 converts an AC voltage generated by motor generator MG1 into a DC voltage based on signal PWMI1 from motor control unit 30, and supplies the resultant DC voltage to voltage step-up converter 12 via capacitor C2. Here, the regenerative braking herein includes braking accompanied by regenerative power generation that is effected when a driver of the hybrid vehicle steps on the foot brake as well as deceleration (or stop of acceleration) of the vehicle accompanied by regenerative power generation that is effected when the driver does not operate the foot brake but releases accelerator pedal 25 while the vehicle is traveling.

Upon receiving the DC voltage from battery B via capacitor C2, inverter 31 converts the DC voltage into an AC voltage based on signal PWMI2 from motor control unit 30, and drives motor generator MG2. Thus, motor generator MG2 is driven to generate a torque according to torque command value TR2.

Further, when hybrid vehicle 100 is regeneratively braked, inverter 31 converts an AC voltage generated by motor generator MG2 into a DC voltage based on signal PWMI2 from motor control unit 30, and supplies the resultant DC voltage via capacitor C2 to voltage step-up converter 12.

Current sensor 24 detects motor current MCRT1 flowing in motor generator MG1, and outputs detected motor current MCRT1 to motor control unit 30. Current sensor 28 detects motor current MCRT2 flowing in motor generator MG2, and outputs detected motor current MCRT2 to motor control unit 30.

Motor control unit 30 receives from ECU 15 (not shown) torque command values TR1, TR2 and control revolution numbers MRN1, MRN2, receives DC voltage Vb from voltage sensor 10, receives output voltage Vm of voltage step-up converter 12 from voltage sensor 13 (namely the input voltage to inverters 14, 31), receives motor current MCRT1 from current sensor 24, receives motor current MCRT2 from current sensor 28, and receives signals θ1, θ2 from rotational position sensors R1, R2.

Based on output voltage Vm, torque command value TR1 and motor current MCRT1, motor control unit 30 generates signal PWMI1 for controlling switching of IGBT devices Q3 to Q8 of inverter 14 when inverter 14 drives motor generator MG1 by a method described hereinlater, and outputs the generated signal PWMI1 to inverter 14.

Further, based on output voltage Vm, torque command value TR2 and motor current MCRT2, motor control unit 30 generates signal PWMI2 for controlling switching of IGBT devices Q3 to Q8 of inverter 31 when inverter 31 drives motor generator MG2, and outputs the generated signal PWMI2 to inverter 31.

Further, when inverter 14 (or 31) drives motor generator MG1 (or MG2), motor control unit 30 generates, based on DC voltage Vb, output voltage Vm, torque command value TR1 (or TR2), and motor revolution number MRN1 (or MRN2), signal PWMC for controlling switching of IGBT devices Q1, Q2 of voltage step-up converter 12 by a method described hereinlater, and outputs the generated signal to voltage step-up converter 12.

Figure 4:
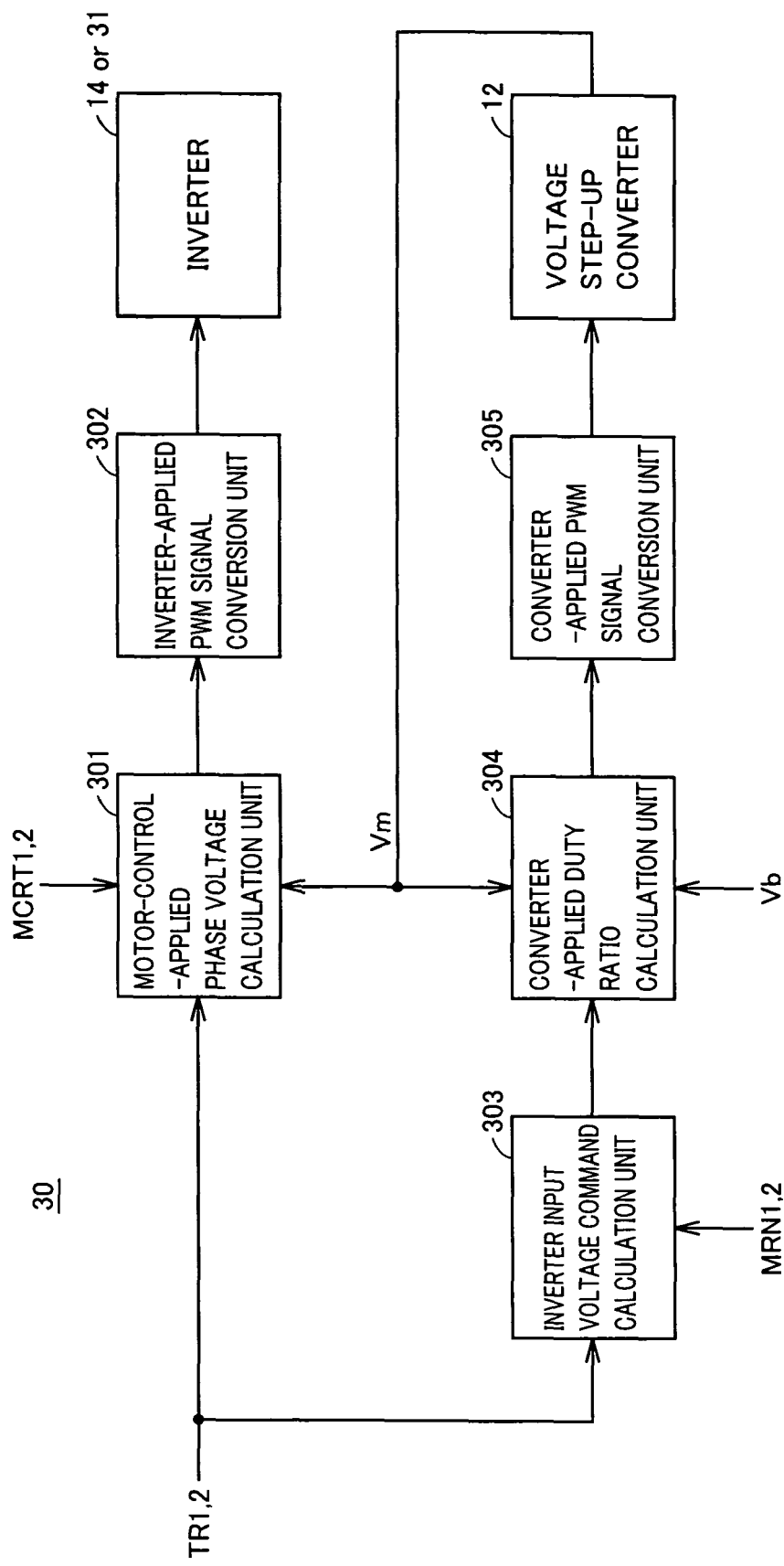
FIG. 4 is a functional block diagram of a motor control unit in FIG. 3.

FIG. 4 is a functional block diagram of motor control unit 30 in FIG. 3.

Referring to FIG. 4, motor control unit 30 includes a motor-control-applied phase voltage calculation unit 301, an inverter-applied PWM signal conversion unit 302, an inverter input voltage command calculation unit 303, a converter-applied duty ratio calculation unit 304, and a converter-applied PWM signal conversion unit 305.

Motor-control-applied phase voltage calculation unit 301 receives from voltage sensor 13 output voltage Vm of voltage step-up converter 12, namely the input voltage of inverter 14, receives motor current MCRT1 from current sensor 24, and receives torque command value TR1 from ECU 15. Based on these input signals, motor-control-applied phase voltage calculation unit 301 calculates a voltage to be applied to the coil of each phase of motor generator MG1, and outputs the result of calculation to inverter-applied PWM signal conversion unit 302.

Further, motor-control-applied phase voltage calculation unit 301 receives from voltage sensor 13 output voltage Vm of voltage step-up converter 12, namely the input voltage of inverter 31, receives motor current MCRT2 from current sensor 28, and receives torque command value TR2 from ECU 15. Based on these input signals, motor-control-applied phase voltage calculation unit 301 calculates a voltage to be applied to the coil of each phase of motor generator MG2, and outputs the result of calculation to inverter-applied PWM signal conversion unit 302.

Based on the result of calculation received from motor-control-applied phase voltage calculation unit 301, inverter-applied PWM signal conversion unit 302 generates signal PWMI1 for actually turning on/off IGBT devices Q3 to Q8 each of inverter 14, and outputs generated signal PWMI1 to IGBT devices Q3 to Q8 each of inverter 14.

Accordingly, switching of IGBT devices Q3 to Q8 is controlled and the current to be flown to each phase of motor generator MG1 is controlled so that motor generator MG1 outputs the torque as instructed. In this way, the motor drive current is controlled and the motor torque is output according to torque command value TR1.

Further, based on the result of calculation received from motor-control-applied phase voltage calculation unit 301, inverter-applied PWM signal conversion unit 302 generates signal PWMI2 for actually turning on/off IGBT devices Q3 to Q8 of inverter 31, and outputs generated signal PWMI2 to IGBT devices Q3 to Q8 each of inverter 31.

Accordingly, switching of IGBT devices Q3 to Q8 is controlled and the current to be flown to each phase of motor generator MG2 is controlled so that motor generator MG2 outputs the torque as instructed. In this way, the motor drive current is controlled and the motor torque is output according to torque command value TR2.

Inverter input voltage command calculation unit 303 calculates, based on torque command values TR1, TR2 and control revolution numbers MRN1, MRN2, an optimum value (target value) of inverter input voltage Vm, namely voltage command Vdc_com, and outputs the calculated voltage command Vdc_com to converter-applied duty ratio calculation unit 304.

Converter-applied duty ratio calculation unit 304 calculates, based on battery voltage Vb from voltage sensor 10, a duty ratio for setting output voltage Vm from voltage sensor 13 to voltage command Vdc_com from inverter input voltage command calculation unit 303, and outputs the calculated duty ratio to converter-applied PWM signal conversion unit 305.

Converter-applied PWM signal conversion unit 305 generates signal PWMC for turning on/off IGBT devices Q1, Q2 of voltage step-up converter 12 based on the duty ratio from converter-applied duty ratio calculation unit 304. Converter-applied PWM signal conversion unit 305 outputs the generated signal PWMC to IGBT devices Q1, Q2 of voltage step-up converter 12.

In this way, motor control unit 30 drives and controls motor generators MG1, MG2 based on torque command values TR1, TR2 and control revolution numbers MRN1, MRN2.

Here, usually the number of revolutions obtained by performing a calculation with signals θ1, θ2 that represent the rotational position of the rotor and that are provided from rotational position sensors R1, R2 (the number of revolutions is hereinafter also referred to as normal revolution number) is used as control revolution numbers MRN1, MRN2.

However, regarding motor generator MG2 coupled to the drive shaft, the number of revolutions of motor generator MG2 may increase sharply in some cases due to for example skid of drive wheels 50L, 50R of hybrid vehicle 100. Therefore, as shown in FIG. 5, in a control period in which the normal revolution number is set to be used as control revolution number MRN2 and drive and control are performed, a deviation undesirably occurs that the actual number of revolutions of motor generator MG2 (hereinafter also referred to as actual revolution number) in the control period is smaller with respect to control revolution number MRN2.

Figure 5:
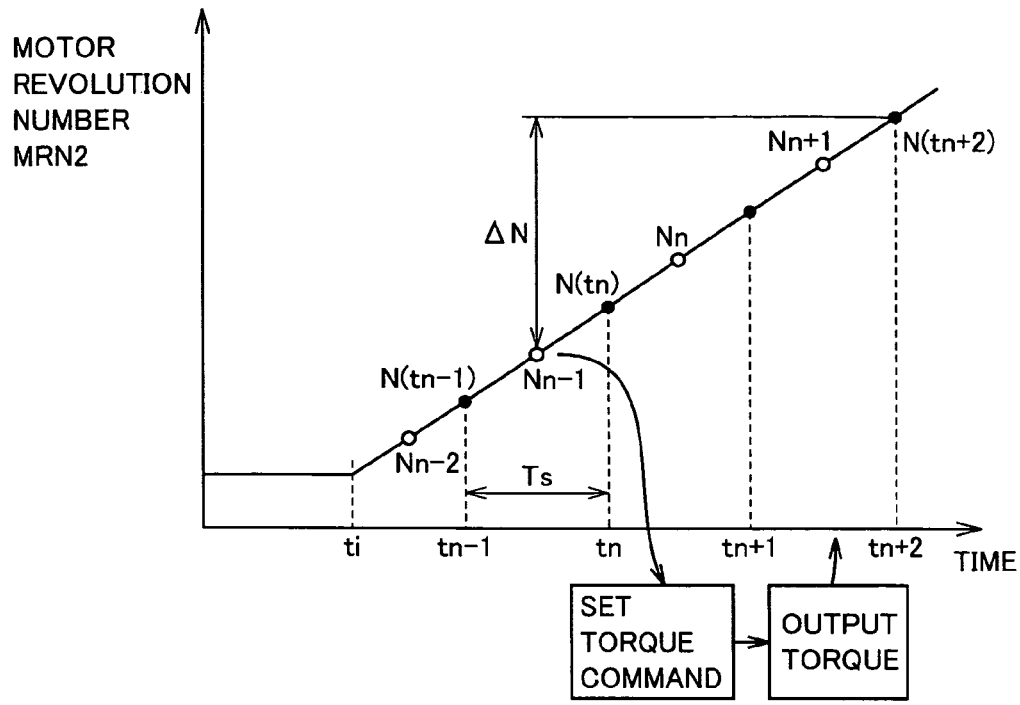
FIG. 5 is a diagram showing a change of a normal revolution number with respect to time.

Referring to FIG. 5, it is supposed for example that drive wheels 50L, 50R skid at time ti to cause the number of revolutions of motor generator MG2 to sharply increase after time ti.

At this time, ECU 15 calculates the normal revolution number for each control period based on signal θ2 from rotational position sensor R2. By way of example, normal revolution number Nn−1 calculated at the timing of time tn in FIG. 5 is determined by time-differentiation of the variation of signal θ2 in the control period from time tn−1 to time tn, using control period length Ts. The determined normal revolution number Nn−1 is substantially almost equal to the average of actual revolution number N (tn−1) at time tn−1 and actual revolution number N (tn) at time tn.

Normal revolution number Nn−1 obtained at time tn is set to be used as control revolution number MRN2. Then, in the control period from time tn to time tn+1, power balance control as described below is performed based on control revolution number MRN2 and the requested torque of motor generator MG2, so that torque command value TR2 for motor generator MG2 is generated.

The power balance control refers to control of the output torque of each motor generator so that a power balance P of the motor drive apparatus as a whole does not exceed the input/output limit of battery B, thereby preventing battery B from being charged or discharged with an excessive power.

Specifically, power balance P of the whole motor drive apparatus can be represented by formula (1):

$$P = Pm + Pg + Lg + Lm + Pc \qquad (1)$$

where Pm is the power consumed by one of the motor generators (one of motor generators MG1 and MG2) when driven in a power running mode, Pg is the power generated by the other motor generator when the other motor generator is driven in a regenerative mode, and Pc is the power input/output to/from capacitor C2. Here, Lg and Lm represent power losses of respective motor generators.

In order to prevent battery B from being charged or discharged with an excessive power, it is necessary to adjust power balance P so that the power input/output to/from battery B does not exceed the input/output limit of battery B, namely so that the relation represented by formula (2) is satisfied:

$$Win < Pm + Pg + Lg + Lm + Pc < Wout \qquad (2)$$

where Win represents the input limit of battery B and Wout represents the output limit of battery B.

Regarding the power balance control, motor-consumed power Pm and motor-generated power Pg used in formula (2) are both calculated by multiplying request torque Tr of each motor generator by control revolution number MRN1 or MRN2. For example, motor-consumed power Pm when motor generator MG2 is in a power running mode and motor-generated power Pg when the motor generator is in a regenerative mode are determined with formulas (3) and (4) respectively:

$$Pm=K\cdot Tr2\times MRN2 \quad (3)$$

$$Pg=K\cdot Tr2\times MN2 \quad (4)$$

where K is a conversion factor for converting a driving force into an electric power.

An upper limit torque that may be output from motor generators MG1, MG2 is calculated in order that the relation of formula (2) may be satisfied, and the calculated upper limit torque is set to be used as torque command values TR1, TR2 of each motor generator.

Referring again to FIG. 5, torque command values TR1, TR2 that are set in the control period from time tn to time tn+1 are sent from ECU 15 to motor control unit 30 in PCU 20. Based on torque command values TR1, TR2 as sent, motor control unit 30 drives and controls motor generators MG1, MG2 in the next control period from time tn+1 to time tn+2.

Here, regarding motor generator MG2, since the number of revolutions of motor generator MG2 sharply increases due to the skid of drive wheels 50L, 50R, there is a large difference between normal revolution number Nn−1 which is used as control revolution number MRN2 for generating torque command value TR and the actual revolution number in the control period in which the motor is actually driven and controlled. In FIG. 5, the maximum revolution number in the control period from time tn+1 to time tn+2, namely actual revolution number N (tn+2) at time tn+2 is larger than normal revolution number Nn−1 by ΔN.

Therefore, motor-consumed power Pm of motor generator MG2 in the control period from time tn+1 to time tn+2 has a maximum value Pm=K·TR2×N (tn+2) calculated using formula (3) in which actual revolution number N (tn+2) is assigned. This maximum value is considerably larger than motor-consumed power Pm=K·Tr2×Nn−1 used for power balance P of formula (2). Therefore, actually, in the control period from time tn+1 to time tn+2, the relation of formula (2) is not satisfied and an electric power exceeding output limit Wout is drawn from battery B. This could cause the power balance control to fail and cause the possibility that battery B is excessively charged/discharged.

In view of this, the control apparatus for the motor in the embodiment of the present invention has the feature that a predicted revolution number that is estimated from a normal revolution number is used as the control revolution number instead of the normal revolution number calculated from the rotational position sensor output, in order to reduce the difference between the control revolution number and the actual revolution number. Thus, even if the number of revolutions sharply increases, battery B can be prevented from being charged or discharged with an excessive power.

A detailed description will be given below of a method of estimating a predicted revolution number in the embodiment of the present invention.

First, the predicted revolution number to be estimated is an estimated actual revolution number at the timing of the end of a control period for which the motor is driven and controlled.

In the example of FIG. 5, actual revolution number N (tn+2) at time tn+2 which is the end of the control period from time tn+1 to time tn+2 is to be estimated. This is for the reason that, in order to surely protect battery B when the revolution number sharply increases, it is necessary that the relation of formula (2) is satisfied at the end of the control period at which the revolution number is expected to be highest.

Therefore, in consideration of the fact that normal revolution number Nn−1 calculated at time tn corresponds to an actual revolution number at a substantially central point of the control period from time tn−1 to time tn, it is seen that the actual revolution number at the time advanced by approximately 2.5 control periods from the time at which normal revolution number Nn−1 is obtained may be estimated.

Next, the actual revolution number at time tn+2 is estimated in the following way. Based on the variation between normal revolution number Nn−1 calculated at time tn and normal revolution number Nn−2 calculated at time tn−1, the variation at the time advanced by 2.5 control periods is determined. It is expected that this method following formula (5) may be a simplest way.

$$N(tn+2)=(Nn-1)+\{(Nn-1)-(Nn-2)\}\times 2.5 \quad (5)$$

However, since normal revolution numbers Nn−2 and Nn−1 are calculated based on output signal θ2 from rotational position sensor R2 for respective control periods, the normal revolution numbers may include small variation components because of influences of noise or the like superposed on signal θ2. Therefore, the method using formula (5) for estimating the predicted revolution number directly from normal revolution numbers Nn−2 and Nn−1 that are calculated for successive control periods respectively may have a problem that it is difficult to stably estimate the predicted revolution number because of influences of small variations of the normal revolution number.

Figure 6:
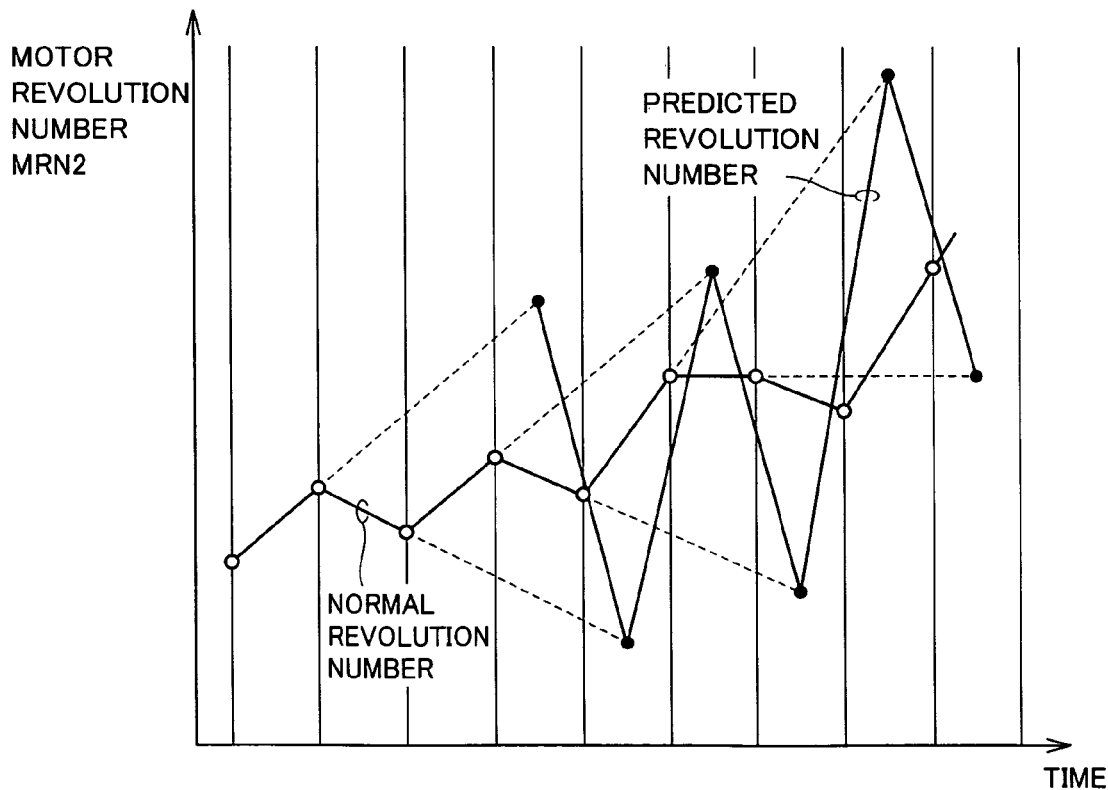
FIG. 6 is a diagram showing respective changes with respect to time of a normal revolution number and a predicted revolution number calculated based on the normal revolution number.

Specifically, in the case where the normal revolution number increases while being accompanied by small increases and decreases as shown in FIG. 6, predicted revolution number N (tn+2) determined by assigning two successive normal revolution numbers Nn−2 and Nn−1 in formula (5) has an unstable output waveform varying to a large extent because of the fact that the small increases and decreases are expanded.

In the case where the predicted revolution number is significantly smaller than the normal revolution number in FIG. 6, motor-consumed power Pm in an actual control period is significantly larger than the predicted motor-consumed power Pm calculated by setting the predicted revolution number to be used as control revolution number MRN2 under the above-described power balance control, resulting in the possibility that battery B is overdischarged.

Thus, a problem here is that battery B is not sufficiently protected due to the fact that the method of estimating the predicted revolution number directly using the normal revolution number cannot provide a stable predicted revolution number.

The embodiment of the present invention accordingly employs a method according to which the predicted revolution number is estimated based on a moving average of the normal revolution number.

The moving average is well known and determined by successively calculating an output average in a certain period defined in advance, so as to find a trend of the output. In the embodiment of the present invention, as shown by formula (6), a certain period is set to k (k is a natural number not less than 2) control periods, and the average of k normal revolution numbers in the certain period is successively calculated to determine a moving average revolution number NAn of the normal revolution number.

$$NAn=\{(Nn-k)+(Nn-k+1)\ldots +Nn-2+Nn-1\}/k \quad (6)$$

For determining the moving average, instead of the method using formula (6), a weighted moving average may be used, determining an weighted average by multiplying each of k normal revolution numbers by a predetermined factor for weighting them. In this case, the predetermined factor is set such that the factor is larger for a more recent normal revolution number.

Then, the predicted revolution number is calculated from formula (7) based on a variation between moving average revolution number NAn−1 at time tn−1 and moving average revolution number NAn at time tn.

$$N(tn+2)=(Nn-1)+\{(NAn)-(NAn-1)\}\times 2.5 \quad (7)$$

Figure 7:
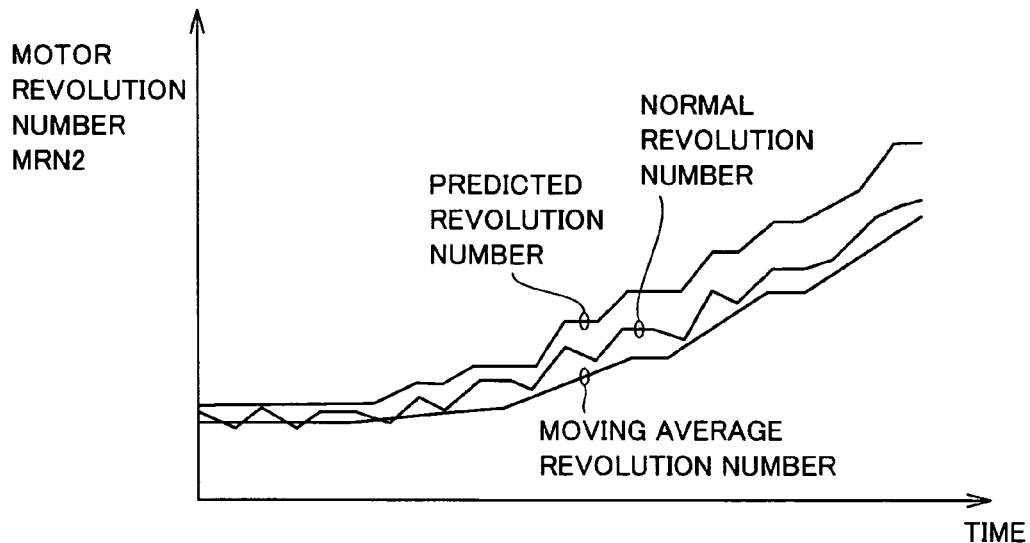
FIG. 7 is a diagram showing respective changes with respect to time of a normal revolution number, a moving average revolution number determined by calculating a moving average of the normal revolution number and a predicted revolution number calculated based on the moving average revolution number.

FIG. 7 is a diagram showing a change with respect to time of the normal revolution number, the moving average revolution number obtained by calculating a moving average of the normal revolution number and the predicted revolution number calculated based on the moving average revolution number.

Referring to FIG. 7, the moving average revolution number does not include variations of the normal revolution number, and suggests that the revolution number has an upward trend. The predicted revolution number determined from the moving average revolution number does not repeatedly increase and decrease relative to the normal revolution number as shown in FIG. 6, and has the stably increasing waveform.

As seen from the above, it does not occur that the predicted revolution number is significantly smaller than the normal revolution number. Therefore, regarding the power balance control, the problem that the predicted value of motor-consumed power Pm calculated by setting the predicted revolution number to be used as control revolution number MRN2 is exceeded by motor-consumed power Pm in an actual control period is overcome. Therefore, battery B can be surely prevented from being charged/discharged with an excessive power.

Actually, the above-described method of estimating the predicted revolution number is performed repeatedly by ECU 15 in FIG. 2 every predetermined control period. The predetermined control period is set in advance to a predetermined period length Ts based on the detection rate of rotational position sensors R1, R2 and the operating ability of the CPU constituting a part of ECU 15.

Figure 8:
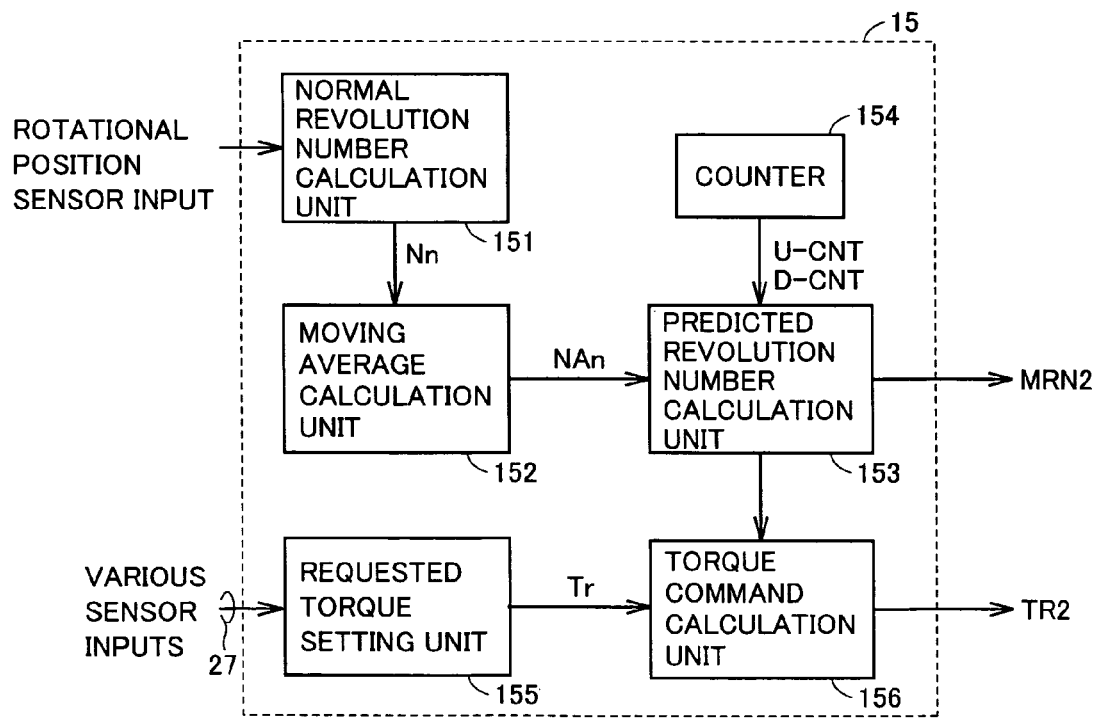
FIG. 8 is a functional block diagram of an ECU in FIG. 2.

FIG. 8 is a functional block diagram of ECU 15 in FIG. 2. Here, FIG. 8 shows a portion of ECU 15 that is relevant to setting of control revolution number MRN2 and torque command value TR2 of motor generator MG2.

Referring to FIG. 8, ECU 15 includes a normal revolution number calculation unit 151, a moving average calculation unit 152, a predicted revolution number calculation unit 153, a counter 154, a requested torque setting unit 155, and a torque command calculation unit 156.

Normal revolution number calculation unit 151 calculates normal revolution number Nn−1 of motor generator MG2 for each control period, based on output signal θ2 from rotational position sensor R2. Normal revolution number calculation unit 151 outputs the calculated normal revolution number Nn−1 to moving average calculation unit 152.

Moving average calculation unit 152 calculates moving average revolution number NAn from normal revolution number Nn provided for each control period, and outputs the calculated moving average revolution number to predicted revolution number calculation unit 153. Namely, moving average revolution number NAn is updated for each control period according to above-described formula (6), and the updated moving average revolution number is successively input to predicted revolution number calculation unit 153.

Predicted revolution number calculation unit 153 receives moving average revolution number NAn and then determines whether or not the revolution number of motor generator MG2 is in an increasing state. In response to the determination that the revolution number of motor generator MG2 is in an increasing state, predicted revolution number calculation unit 153 calculates predicted revolution number N (tn+2) based on moving average revolution number NAn using the above-described method.

Here, the determination as to whether or not the revolution number of motor generator MG2 is in an increasing state is made based on whether or not moving average revolution number NAn updated for each control period successively changes in an upward direction multiple times. Here, the upward direction refers to the case where a variation of moving average revolution number NAn in a current control period relative to moving average revolution number NAn−1 in the preceding control period is not less than zero. The downward direction refers to the case where a variation of moving average revolution number NAn in a current control period relative to moving average revolution number NAn−1 in the preceding control period is less than zero.

In the case where moving average revolution number NAn continuously changes in the upward direction in successive multiple (five for example) control periods, it is determined that the revolution number of motor generator MG2 is in an increasing state, and predicted revolution number N (tn+2) is calculated from the variation of moving average revolution number NAn. Calculated predicted revolution number N (tn+2) is set to be used as control revolution number MRN2, and is output to motor control unit 30 and torque command calculation unit 156.

In contrast, in the case where moving average revolution number NAn does not change in the upward direction in successive five control periods, predicted revolution number calculation unit 153 determines that the revolution number of motor generator MG2 is not in an increasing state and does not calculate predicted revolution number N (tn+2) but sets normal revolution number Nn−1 to be used as predicted revolution number N (tn+2). The set predicted revolution number (namely normal revolution number Nn−1) is output as control revolution number MRN2 to motor control unit 30 and torque command calculation unit 156.

Counter 154 counts the number of times moving average revolution number NAn changes in the upward direction. Counter 154 increments count value U_CNT by +1 in response to the fact that moving average revolution number NAn successively changes in the upward direction. Predicted revolution number calculation unit 153 calculates predicted revolution number N (tn+2) in response to the fact that count value U_CNT from counter 154 reaches 5. Counter 154 resets count value U_CNT to "0" when the direction of the change of moving average revolution number NAn switches to the downward direction.

With the configuration as described above, even if the number of revolutions of motor generator MG2 changes sharply, the predicted revolution number is stably estimated. Therefore, the predicted revolution number can be used as a control revolution number to stably perform the power balance control.

Further, count value U_CNT used as a reference for determining the increasing state of the revolution number may be set relatively smaller as the variation of moving average revolution number NAn is larger. Thus, in response to a sharp change of the revolution number, the predicted revolution number is immediately estimated to be used as the control revolution number. Therefore, the battery can be protected more sufficiently.

However, when drive wheels 50L, 50R skid, the number of revolutions of motor generator MG2 may show the tendency that the revolution number having been increasing changes to decrease, and thereafter increases again depending on the state of the vehicle, other than the tendency that the number of revolutions monotonously increases as shown in FIG. 2. In this case, if the predicted revolution number is calculated from the moving average revolution number all the time regardless of whether or not the revolution number increases or decreases, the power balance control may fail.

Figure 9:
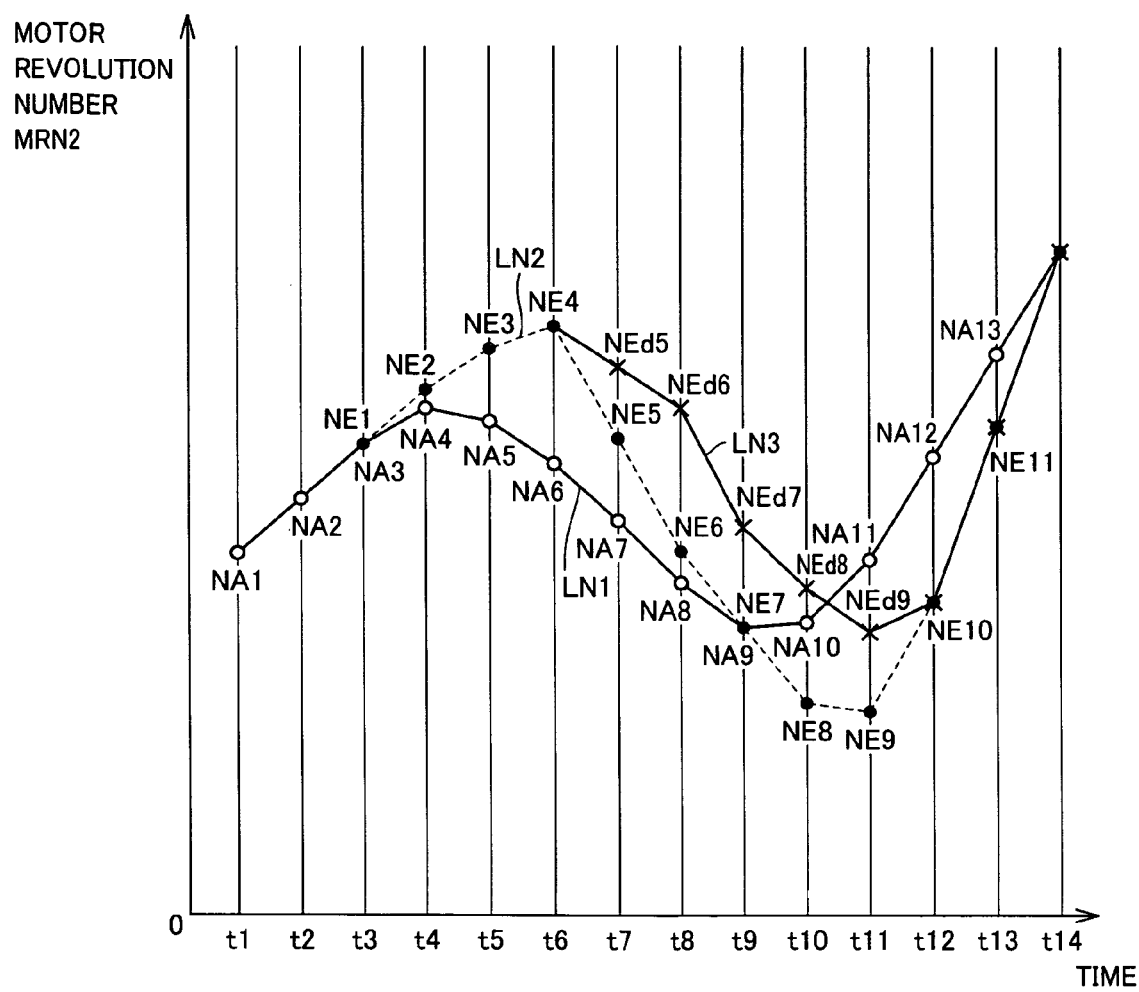
FIG. 9 is a diagram showing respective changes with respect to time of a moving average revolution number and a predicted revolution number calculated based on the moving average revolution number.

Specifically, in the case where the revolution number does not increase monotonously, moving average revolution number NAn shows the waveform changing in the upward direction till time t4 as indicated by a curve LN1 in FIG. 9 (corresponding to moving average revolution numbers NA1-NA4), thereafter changing in the downward direction in the period from time t4 to time t9 (corresponding to NA5-NA9) and then increasing again after time t9 (corresponding to NA10-NA13).

The predicted revolution number calculated based on this moving average revolution number NAn shows the waveform as shown by a curve LN2 in the drawing, increasing till time t6 (corresponding to predicted revolution numbers NE1-NE4), decreasing in the period from time t6 to time t11 (corresponding to NE5-NE9) and then increasing again from time t11 (NE10-NE11).

From a comparison between curve LN1 and curve LN2, it is apparently seen that the predicted revolution number is smaller than the moving average revolution number in the period from time t9 to time t14. Therefore, in this period, motor-consumed power Pm with the actual revolution number exceeds motor-consumed power Pm which is set under the power balance control using predicted revolution numbers NE8 to NE11 as control revolution number MRN2. As a result, battery B could be overdischarged.

Accordingly, the embodiment of the present invention does not estimate the predicted revolution number in the above-described manner in the case where it is determined that the revolution number of motor generator MG2 is in the decreasing state, in consideration of the fact that the predicted revolution number may be estimated smaller than the actual revolution number.

Specifically, upon receiving moving average revolution number NAn, predicted revolution number calculation unit 153 determines, from the locus of moving average revolution number NAn, whether or not the revolution number of motor generator MG2 is in a decreasing state. When it is determined that the revolution number of motor generator MG2 is in a decreasing state, predicted revolution number calculation unit 153 sets normal revolution number Nn−1 to be used as predicted revolution number N (tn+2), and outputs the normal revolution number to motor control unit 30 and torque command calculation unit 156.

At this time, the determination as to whether or not the revolution number of motor generator MG2 is in a decreasing state is made based on whether or not moving average revolution number NAn, which is updated for every control period, successively changes in the downward direction multiple times. Here, the criterion of the determination is specified as the successive and multiple occurrences of the change in the downward direction, for preventing the stability in driving and controlling the motor from being lost due to the fact that predicted revolution number calculation unit 153 frequently changes the method of estimation.

In the case where moving average revolution number NAn continuously changes in the downward direction in successive and multiple (3 for example) control periods, predicted revolution number calculation unit 153 determines that the revolution number of motor generator MG2 is in a decreasing state, and directly sets normal revolution number Nn−1 to be used as predicted revolution number N (tn+2) without calculating predicted revolution number N (tn+2). Thus, normal revolution number Nn−1 is output as control revolution number MRN2 to motor control unit 30 and torque command calculation unit 156.

Counter 154 counts the number of times moving average revolution number NAn changes in the downward direction. When moving average revolution number NAn successively changes in the downward direction, counter 154 increments count value D_CNT by +1. When count value D_CNT from counter 154 reaches 3, predicted revolution number calculation unit 153 directly sets normal revolution number Nn−1 to be used as predicted revolution number N (tn+2). Counter 154 resets count value D_CNT to "0" when the direction of the change of moving average revolution number NAn changes to the upward direction.

Further, in the embodiment of the present invention, the method of estimating the predicted revolution number is changed depending on whether the revolution number of motor generator MG2 is in an increasing state or decreasing state. Accordingly, there is a transition period from the time when the direction of change of the moving average revolution number switches from the upward direction to the downward direction to the time when it is determined that the change of the moving average revolution number is in a decreasing state from the fact that the moving average revolution number successively changes in the downward direction. In this period, the variation of the predicted revolution number is restricted, in order to prevent a sudden change of control revolution number MRN2 immediately after the method of estimating the revolution number is changed.

Specifically, with reference to curve LN1 in FIG. 9, the moving average revolution number successively changes in the downward direction after time t5. Predicted revolution number calculation unit 153 starts incrementing count value D_CNT from time t5. When count value D_CNT reaches 3 at time t7, it is determined that the revolution number of motor generator MG2 is in a decreasing state. Then, the predicted revolution number is not estimated and normal revolution number Nn−1 is set to be used as predicted revolution number N (tn+2).

Further, in the period from time t5 at which increment of count value D_CNT is started to time t7 at which count value D_CNT reaches 3, predicted revolution number calculation unit 153 calculates predicted revolution number N (tn+2) using the following formula:

$$N(tn+2)=N(tn+1)-\{N(tn+1)-Nn-1\}\times 1/a \qquad (8)$$

where N (tn+1) is the predicted revolution number in a preceding control period and a is a natural number not less than 2.

Accordingly, respective predicted revolution numbers calculated at time t5 and time t6 are those indicated by points NEd5 and NEd6 on a curve LN3 in the drawing. In the period from time t7 at which it is determined that the revolution number is in a decreasing state to time t9, the predicted revolution number is identical to normal revolution number Nn−1 from time t7 to time t9 and is the revolution number indicated by points NEd7, NEd8 and NEd9 on curve LN3. Further, after time t10 at which the direction of change of the moving average revolution number switches again to the upward direction, the predicted revolution number is set to the revolution number (corresponding to points NE10, NE11 on curve LN3) determined by substituting the moving average revolution number to formula (5) above.

In this way, depending on whether the revolution number is in an increasing state or decreasing state, the method of estimating the predicted revolution number is switched, so that the predicted revolution number has the waveform represented by curve LN3. As clearly seen from a comparison between curve LN3 and curve LN2, the cases where the predicted revolution number is significantly smaller than the moving average revolution number are reduced as compared with the calculation of the predicted revolution number from the moving average revolution number all the time regardless of whether the revolution number increases or decreases. Thus, motor-consumed power Pm at an actual revolution number is prevented from exceeding motor-consumed power Pm which is set under the power balance control using the predicted revolution number as control revolution number MRN2. Thus, battery B can be prevented from charged or discharged with an excessively large power.

Figure 10:
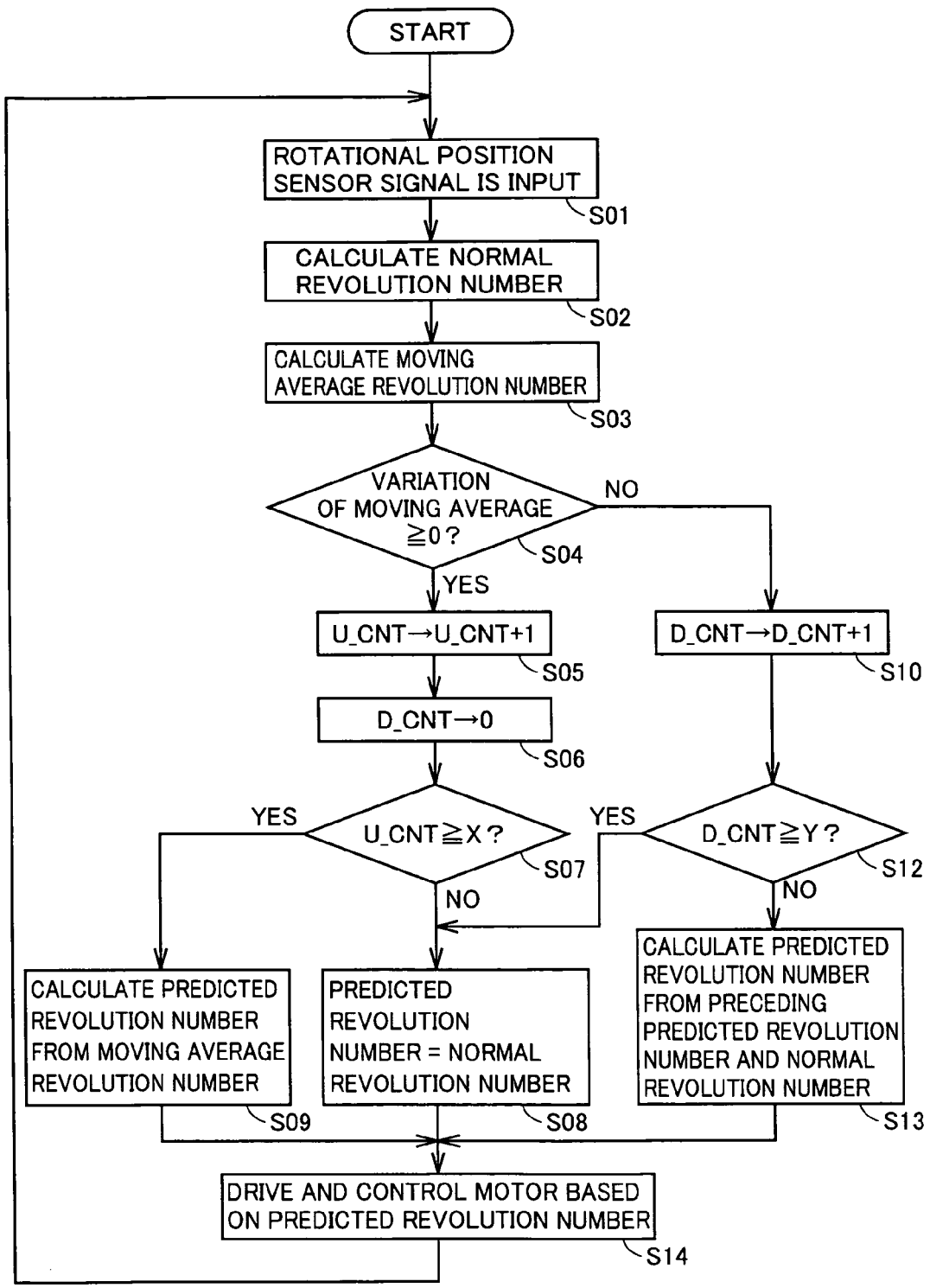
FIG. 10 is a flowchart illustrating a method of estimating a predicted revolution number according to an embodiment of the present invention.

FIG. 10 is a flowchart illustrating a method of estimating the predicted revolution number according to the embodiment of the present invention.

Referring to FIG. 10, in response to input of signal θ2 from rotational position sensor R2 (step S01), normal revolution number calculation unit 151 of ECU 15 first calculates normal revolution number Nn−1 of motor generator MG2 for each control period based on this input signal θ2 (step S02). Then, normal revolution number calculation unit 151 outputs the calculated normal revolution number Nn−1 to moving average calculation unit 152.

Moving average calculation unit 152 calculates moving average revolution number NAn of normal revolution numbers Nn provided in respective control periods, and outputs the moving average revolution number to predicted revolution number calculation unit 153 (step S03).

Predicted revolution number calculation unit 153 receives moving average revolution number NAn and then determines whether the variation of moving average revolution number NAn is 0 or more, namely whether moving average revolution number NAn changes in the upward direction (step S04).

When it is determined that the variation of the moving average revolution number NAn is not less than 0 in step S04, predicted revolution number calculation unit 153 increments count value U_CNT of counter 154 by +1 (step S05). Further, predicted revolution number calculation unit 153 resets count value D_CNT to "0" (step S06).

Then, predicted revolution number calculation unit 153 determines whether or not count value U_CNT is not less than X (X is a natural number not less than 2) (step S07). When it is determined in step S07 that count value U_CNT is not less than X, namely it is determined that moving average revolution number NAn successively changes in the upward direction X times, predicted revolution number calculation unit 153 determines that the revolution number of motor generator MG2 is in an increasing state. Then, predicted revolution number calculation unit 153 calculates predicted revolution number N (tn+2) from the variation of moving average revolution number NAn using the above-described method (step S09).

In contrast, when it is determined in step S07 that count value U_CNT is smaller than X, predicted revolution number calculation unit 153 determines that the revolution number of motor generator MG2 is not in an increasing state. In this case, predicted revolution number calculation unit 153 does not calculate predicted revolution number N (tn+2) and sets normal revolution number Nn−1 to be used as predicted revolution number N (tn+2) (step S08).

In step S04 again, when it is determined that the variation of moving average revolution number NAn is less than 0, predicted revolution number calculation unit 153 determines that moving average revolution number NAn changes in the downward direction and increments count value D_CNT of counter 154 by +1 (step S10).

Then, predicted revolution number calculation unit 153 determines whether or not count value D_CNT is not less than Y (Y is a natural number not less than 2) (step S12). In response to the determination that count value D_CNT is smaller than Y in step S12, predicted revolution number calculation unit 153 determines that moving average revolution number NAn is in a transition period from the time when the direction of the change switches from the upward direction to the downward direction to the time when the revolution number successively changes in the downward direction Y times. In this case, predicted revolution number calculation unit 153 calculates predicted revolution number N (tn+2) based on predicted revolution number N (tn+1) in the preceding control period and the normal revolution number in the present control period using the above-described method (step S13).

In response to the fact that count value D_CNT becomes Y or more in step S12, namely that moving average revolution number NAn successively changes in the upward direction Y times, predicted revolution number calculation unit 153 determines that the revolution number of motor generator MG2 is in a decreasing state. In this case, predicted revolution number calculation unit 153 does not calculate predicted revolution number N (tn+2) but sets normal revolution number Nn−1 to be used as predicted revolution number N (tn+2) (step S08).

Predicted revolution number N (tn+2) determined in steps S08, S09 and S13 each is set to be used as control revolution number MRN2 and is output to motor control unit 30 and torque command calculation unit 156.

Torque command calculation unit 156 performs the power balance control based on control revolution number MRN2 and the requested torque of motor generator MG2, generates and outputs torque command value TR2 for motor generator MG2 to motor control unit 30. Receiving control revolution number MRN2 and torque command value TR2, motor control unit 30 controls the current to be flown to each phase of motor generator MG2 so that motor generator MG2 outputs the designated torque (step S14). In this way, the motor drive current is controlled and the motor torque is output according to torque command value TR2.

As heretofore described, according to the embodiment of the present invention, the predicted revolution number is estimated stably even if the revolution number of the motor generator sharply changes. Therefore, the predicted revolution number can be used as the control revolution number to stably perform the power balance control. Consequently, the battery can be prevented from being charged or discharged with an excessively large power.

Further, the method of estimating the predicted revolution number is switched depending on whether the revolution number of the motor generator increases or decreases, so that the case where the estimated predicted revolution number is smaller than the actual revolution number is reduced. Therefore, the battery can be protected surely without causing the power balance control to fail.

It should be construed that embodiments disclosed above are by way of illustration in all respects, not by way of limitation. It is intended that the scope of the present invention is defined by claims, not by the description above, and includes all modifications and variations equivalent in meaning and scope to the claims.

INDUSTRIAL APPLICABILITY

The present invention is applicable to a control apparatus for a motor mounted on a vehicle using the motor as a source of driving force.

The invention claimed is:

1. A control apparatus for a motor driving and controlling the motor according to a driving-force command value, the control apparatus comprising:
   a revolution number detection unit detecting a number of revolutions of said motor;
   a moving average calculation unit calculating a moving average of a detected value of said number of revolutions;
   a revolution number estimation unit estimating a predicted number of revolutions at a predetermined control timing, using said calculated moving average;
   a driving-force command setting unit using said estimated predicted number of revolutions as a control revolution number and setting said driving-force command value at said predetermined control timing based on said control revolution number; and
   a motor drive control unit receiving an electric power from a power supply and driving and controlling said motor such that an output of said motor follows said driving-force command value.

2. The control apparatus for the motor according to claim 1, wherein
   said driving-force command setting unit sets said driving-force command value such that, when said motor operates in a power running mode, an amount of power consumed by said motor according to said control revolution number and said driving-force command value does not exceed an output power limitation value of said power supply, and sets said driving-force command value such that, when said motor operates in a regenerative mode, an amount of power generated by said motor according to said control revolution number and said driving-force command value does not exceed an input power limitation value of said power supply.

3. The control apparatus for the motor according to claim 1, further comprising a revolution-number varying state determination unit determining whether said number of revolutions is in an increasing state or a decreasing state, based on said moving average, wherein
   said revolution number estimation unit estimates said predicted number of revolutions at said predetermined control timing when it is determined that said number of revolutions is in said increasing state, and inhibits estimation of said predicted number of revolutions when it is determined that said number of revolutions is in said decreasing state.

4. The control apparatus for the motor according to claim 3, wherein
   said revolution number estimation unit directly sets and outputs said detected value of the number of revolutions to be used as said predicted number of revolutions, when it is determined that said number of revolutions is in said decreasing state.

5. The control apparatus for the motor according to claim 4, wherein
   said revolution-number varying state determination unit determines that said number of revolutions is in said increasing state when said moving average increases in n (n is a natural number not less than 2) successive control periods, and determines that said number of revolutions is in said decreasing state when said moving average decreases in m (m is a natural number not less than 2) successive control periods.

6. The control apparatus for the motor according to claim 5, wherein
   said revolution number estimation unit sets said predicted number of revolutions larger than said predicted number of revolutions that is estimated based on said moving average and lower than said detected value of the number of revolutions, in a period from start of decrease of said moving average to determination that said number of revolutions is in said decreasing state.

7. The control apparatus for the motor according to claim 5, wherein
   said revolution-number varying state determination unit sets said n relatively smaller as an amount of increase of said moving average in said control periods is larger, and sets said m relatively smaller as an amount of decrease of said moving average in said control periods is larger.

8. The control apparatus for the motor according to claim 2, further comprising a revolution-number varying state determination unit determining whether said number of revolutions is in an increasing state or a decreasing state, based on said moving average, wherein
   said revolution number estimation unit estimates said predicted number of revolutions at said predetermined control timing when it is determined that said number of revolutions is in said increasing state, and inhibits estimation of said predicted number of revolutions when it is determined that said number of revolutions is in said decreasing state.

* * * * *